3,259,533
METHOD AND APPARATUS FOR WRAPPING
INSULATING MATERIAL AROUND AN AD-
VANCING PIPE
Philip Goran Philipson, Vasteras, Sweden, assignor to
Aktiebolaget Svenska Metallverken, Vasteras, Sweden,
a joint-stock company limited
Filed July 6, 1964, Ser. No. 380,600
Claims priority, application Sweden, June 22, 1961,
6,561/61
11 Claims. (Cl. 156—201)

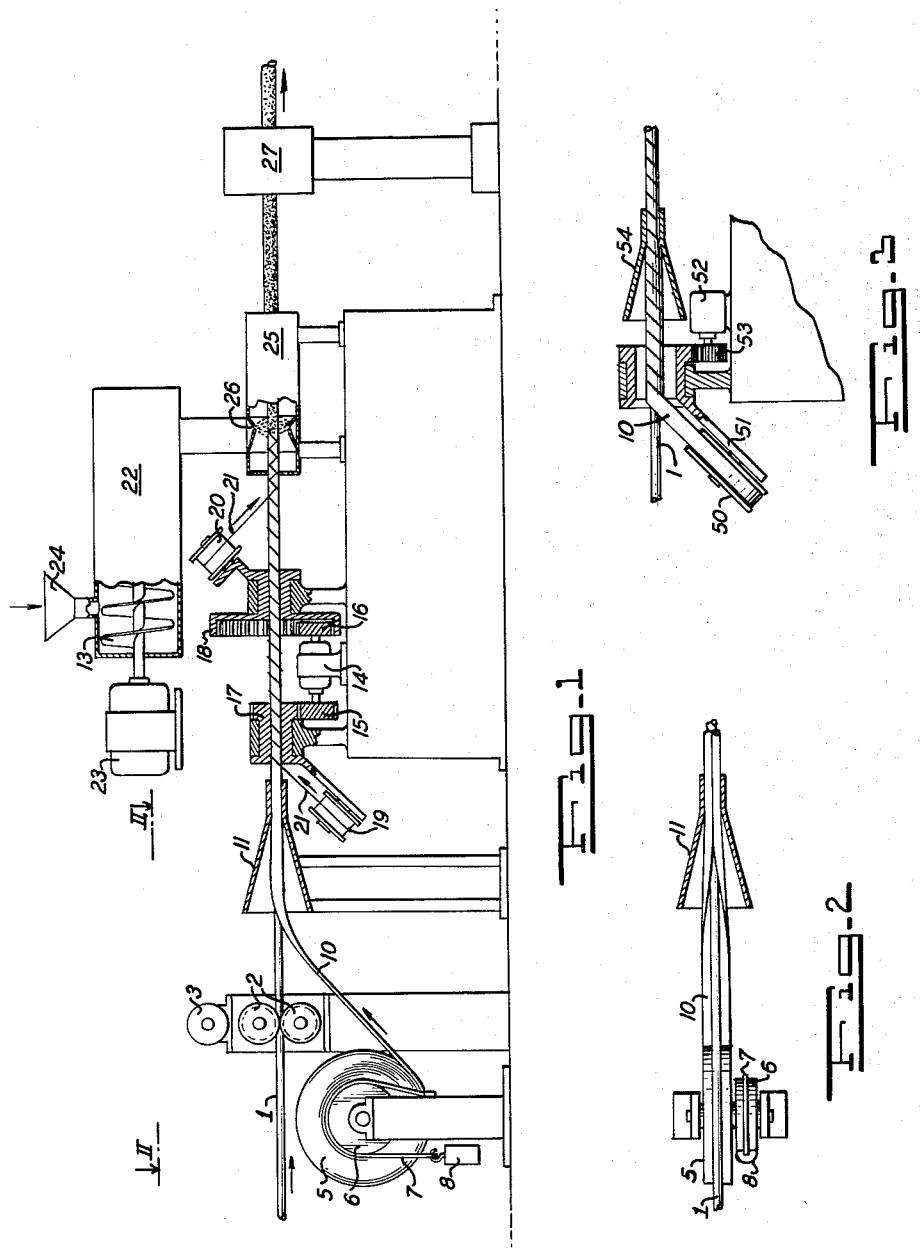

The present invention relates to methods for the continuous production of pipes provided with an insulating jacket, to pipes insulated according to said method, and to apparatus for effecting said methods. This application is a continuation-in-part of my previous application Serial No. 204,540 filed June 22, 1962 and now abandoned.

An old problem which heretofore defied solution was how, in a practical and economical way, to continuously produce a pipe having insulation attached thereto. No method has heretofore been developed which provides a satisfactory solution to the problem at least not when the question of a continuous production process utilizing the least possible manual effort is involved.

As a result thereof when insulating pipes of the type for instance for use as cold-water pipes, hot-water pipes or for central heating systems are to be used it was necessary to manually wrap the pipes with various insulating materials at the place of assembling using materials such as sheets of fibrous materials, cardboard papers, felt mineral wool, glass fibre, rock-wool and the like.

In order to facilitate the application of insulating material onto pipes it has also been recently suggested to use pre-shaped semi-circular insulating coverings of plastic, cork or other material, which coverings are secured around the pipes at the place of assembling by manual effort.

However, it is extremely desirable that insulation of the pipes be carried out such that insulated pipes can be continuously produced and adapted for delivery in a coiled state or in straight lengths directly to the places of use where the pipes may be assembled directly in the same way as non-insulated pipes but without requiring subsequent expensive manual effort for applying insulating material to the pipe.

It is an object of the invention to establish a simple and economical manner for continuously producing insulated pipes.

It is a further object of the invention to produce an insulated pipe in continuous manner in which the insulation material will be fixed to the pipe and will permit the pipe to be used in unrestricted fashion.

The above objects are obtained according to the invention by advancing a length of pipe lengthwise thereof in continuous fashion while securing insulating material to said pipe continuously.

It is a feature of the invention that the pipe is advanced in its longitudinal direction while sheets of insulating material are continuously wrapped around the pipe by funnel-like die means while the insulating material is secured to the pipe by encircling the same with cords, wires, metal coils, rings or the like. Particular winding machines for this purpose may be placed on the discharge side of the funnel-like die means and be arranged in coordination with the rate of feeding of the pipe to wind the wires or the like in helical fashion around the insulating material. As an alternative the insulating material may be encircled at a definite pitch by metal strips, metal wire or the like in the form of rings, which may for instance be joined by welding for retaining the insulating material around the pipe while maintaining a desired external shape.

If it is desired to protect the insulating material against penetrating moisture, it is a further feature of the invention to mechanically wind plastic or other insulating strips around the insulating material and the means securing the material to the pipe, the plastic or other insulating strips thereafter being pasted, welded or vulcanized to said insulating material to form a tight sealing cover therefor which on the one hand forms a moisture protection layer and on the other hand assists in maintaining the shape of the insulating material.

In accordance with another feature of the invention, after the wire or the like has been disposed around the insulating material the pipe is passed through die means wherein the external surface of the material will be covered by a liquified or softened plastic material which is molded during its passage through the die means so that the pipe will be discharged in a completed state having a tightly sealing protective covering of integral plastic.

According to a further feature of the invention long strips of insulating material, preferably of glass fibre, are helically wound around the advancing pipe. Simultaneous with the winding, shaping wire or the like is wound around the insulating jacket thus formed. Thereafter the insulating jacket and wire is covered by a protective covering as above described if desired. In cases where there is no need for moisture-proofing the insulating material, it is possible to eliminate the outer sealing cover thereby obtaining a somewhat cheaper final product.

According to a further feature of the invention, the insulating material may be continuously formed in end to end sections on the pipe and compressed in sections around the pipe. The sections are secured to the pipe by means of suitable strips or wires wound around the sections while providing the insulation with a relatively regular shape.

According to a still further feature of the invention, a ring of nozzles for spraying the advancing pipe is employed for covering the pipe with a foam plastic which while swelling or expanding may pass through shaping dies until the swelling has been stabilized, or has ceased, so that the pipe and the insulating jacket may be freely discharged from the die.

According to another feature of the invention, an insulating jacket may be provided on the pipe by winding a relatively thin broad strip of material in helical fashion around predetermined quantities of relatively non-continuous insulating material on the pipe. The insulating material is retained between the strip and the pipe to form a layer of suitable thickness.

According to the invention either the pipe may be rotated during the various working procedures or the various strips, wires or the like may be wound around a non-rotated pipe.

In certain applications of the invention it may be economically advantageous in order to save plastic to prepare mixtures of other insulating materials such as suitable plastic glass fibres, rock-wool, or other fibrous material and to utilize suitable plastic binding means or the like to exert a joining action on the insulating fibres while also acting in a somewhat plastic manner. In such cases after carrying out the application of the insulating material to the pipe the surface layers of the material may be hot pressed in such a way that the insulating material will be compressed into the form of a shell of a moisture repellant character. It is seen from the above that in some cases the insulating material is formed to the desired shape by a compressing action whereas in other cases the insulating material is provided with the desired shape by encircling wires and the like.

Regarding the wires utilized to secure the insulating material to the pipe, it should be noted that the invention also covers cross winding of wires along the length of the pipe and securing of the wires together at their intersection joints as for example by welding to enable the cutting of the insulated pipes in arbitrary lengths without risk of the binding or compressing action of said wires being destroyed.

Further features, objects and advantages will be apparent from a description hereinfollowing of specific embodiments of the invention. The invention is not limited, however, to the described embodiments as illustrated in the drawing and wherein:

FIGURE 1 shows in elevation partly in section a first embodiment according to the invention;

FIG. 2 shows in plan a detail of the embodiment in FIG. 1 as seen in the direction of arrows II—II with parts omitted for purpose of clarity; and FIG. 3 shows in elevation, partly in section, a variation of a portion of the embodiment of FIG. 1 which is adapted to apply insulating material onto the pipe.

According to the drawing a pipe 1 is advanced in the direction of the arrow under the action of friction rollers 2 which are adapted for being driven by motor 3. The pipe may be an annealed metal pipe or a flexible plastic pipe and although the pipe is shown as entering the friction rollers 2 in substantially straight condition it is to be understood that the pipe may be of sufficient flexibility so that it may be unwound from a reel. As shown in FIG. 1 the pipe is then covered with insulating material 10 as the pipe passes through a shaping and compression means constituted by funnel shaped die 11.

The insulating material is wound on reel 5 in sheet form and the material extends from reel 5 to encircle the pipe 1 and be folded thereover in die 11 so as to form a seam extending lengthwise of the pipe. The die 11 compresses the material onto the advancing pipe and causes the material 10 to advance with the pipe which in turn causes a steady feeding of the material towards the pipe from reel 5. A braking force is exerted on this reel by braking drum 6 which has a removable weight 8 wrapped therearound by rope 7. The weight serves to exert a restraining force on the reel and the restraining force is a function of the magnitude of the weight. The braking or restraining force regulates the tension in the sheet 10 being fed towards the pipe.

The pipe, with the insulating material wrapped therearound, then passes through a winding means whereat wire is cross wound around the insulating material covering the pipe to secure the material to the pipe. The winding means comprises supports 17, 18 which are driven by motor 14 around the pipe. The supports may be driven by gears 15 and 16 coupled to the motor 14. The supports are inclined with respect to the pipe and each support carries a spool of wire 19, 20 respectively. As the pipe is being advanced, the supports rotate around the pipe winding wire 21 from the spools thereover. The supports are inclined in different directions whereby a cross winding of the wire is obtained on the insulating material on the pipe. Quite clearly, the supports 17, 18 could be maintained in stationary position while the pipe could be rotated as it is advanced to obtain the same cross winding effect. After the pipe has passed through the winding means the insulating material is secured to the pipe.

The wire-wound insulated pipe may then be covered with a plastic coating for providing a moisture impervious pipe. It is understood however that the pipe may be discharged directly from the winding means without application of the plastic layer.

To apply a plastic layer to the pipe, suitable plastic material is fed into hopper 24 wherefrom it is deposited onto screw 13. The screw 13 is driven by motor 23 to cause the plastic material to be advanced to a means for causing the plastic material to be formed as a spray. The latter means may be of conventional kind and illustration is not furnished therefor. The means is generally indicated by the numeral 22. The plastic material in spray form is led to chamber 25 wherein a plurality of nozzles 26 encircling the pipe are provided. The nozzles 26 discharge the material in spray form onto the pipe. The insulated pipe with plastic coating thereon is led from chamber 25 to provide a substantially completed pipe. If desired, however, a further die 27 may be provided for compressing the plastic coating or for forming the same into a desired outer shape for the pipe.

It is to be understood that many variations of the above are possible and fall within the scope of the invention. Thus, the sheet 10 may be formed of discontinuous sheets which are wrapped on the passing pipe 1 so that the sheets are in end to end relation thereon. Thereafter the winding means may be supplied with material in the form of strips rather than wire, the strips being of suitable width to cause overlapping as the strips are wound around the insulating material whereby a continuous covering is formed for the insulating material.

It is to be further understood that the desired apparatus is intended for continuous operation. Thus the pipe 1 is driven continuously and the sheet 10 is continuously wound thereon. Similarly, the winding means is continuously operative and the nozzles continuously spray plastic material onto the continuously advancing pipe. It is to be appreciated that the relation between the speed of rotation of the winding means and the speed of advancement of the pipe regulates the pitch of the resultant helically wound wire on the pipe. Similarly, if the pipe is rotated while it is advanced and the winding means is maintained stationary, the patch of the wire will be related to the relationship between the angular speed of the pipe and the linear speed of advancement of the pipe.

FIG. 3 shows a modified device for wrapping insulating material around the pipe. In this device the insulating material is wrapped around the pipe in substantially the same way as the wire is wrapped around the insulating material.

In FIG. 3 a reel 50 supports insulating material 10 thereon. The reel 50 is inclined relative to the pipe and is supported on a support 51 which is adapted for rotation around the pipe. The support is driven by motor 52 through the intermediary of gear 53. As the support rotates around the pipe insulating material 10 is caused to be wrapped around the pipe. The angle of the reel 50 is selected in accordance with the speed of advancement of the pipe and the width of the strip of insulating material so that the insulating material will be wound in overlapped relation on the pipe. The pipe with the insulating material wrapped thereon is then passed through a die 54 which compresses the material onto the pipe. The die is entirely optional and may be dispensed with if desired. After passing through the die, the pipe is treated in the same manner as shown in FIG. 1.

It will be obvious to those skilled in the art to modify and vary the disclosed methods and apparatus in the invention without departing from the spirit of the following claims.

What is claimed is:

1. A method comprising advancing a pipe in axial direction, supplying a flat strip of fibrous insulating material for application to the pipe, applying the strip to the pipe, folding the strip around the pipe to form a longitudinal seam, and drawing the strip along the pipe and compressing said strip around said pipe by passing the pipe through a restricted opening with the insulating material thereon, such that movement of the pipe through said opening acts to draw the strip along and against the pipe.

2. A method as claimed in claim 1 further comprising wrapping a further strip around the insulation material on the pipe as the latter passes through the restricted opening to hold the insulating material on the pipe.

3. A method as claimed in claim 2 comprising spraying said further strip with plastic to form a coating thereon.

4. A method as claimed in claim 3 comprising passing the thusly coated pipe through a die to compress the coating.

5. Apparatus comprising a source of fibrous insulating material in the form of a strip, a tubular member having a restricted opening therein, and means to drive a pipe axially through the tubular member with the strip applied to the pipe whereby the strip is compressed around the pipe, said source being adapted to supply said strip at a rate controlled by the passage of the pipe through the tubular member.

6. Apparatus as claimed in claim 1 wherein the tubular member is a stationary funnel-shaped device.

7. Apparatus as claimed in claim 5 wherein said source comprises a reel and a friction drag operatively associated therewith.

8. Apparatus as claimed in claim 7 comprising wrapping means to wrap a further strip around the insulating material to hold the latter on said pipe.

9. Apparatus as claimed in claim 8 comprising means to spray a plastic coating on the said further strip.

10. Apparatus as claimed in claim 9 comprising means to compress said plastic coating.

11. Apparatus as claimed in claim 8 wherein said wrapping means includes means to wind said further strip helically around said pipe.

References Cited by the Examiner
UNITED STATES PATENTS

| | | | |
|---|---|---|---|
| 2,044,456 | 6/1936 | Yeager | 156—392 X |
| 2,344,264 | 3/1944 | Perrault | 156—392 |
| 2,605,202 | 7/1952 | Reynolds | 156—171 X |
| 2,674,297 | 4/1954 | Greenwald | 156—171 X |
| 2,746,516 | 5/1956 | Cummings | 156—392 X |
| 2,828,798 | 4/1958 | Hopkins et al. | 156—187 |
| 3,121,446 | 2/1964 | Richardson et al. | 138—144 |
| 3,126,034 | 3/1964 | Kennedy | 138—144 |

EARL M. BERGERT, *Primary Examiner.*

LEWIS J. LENNY, *Examiner.*

P. DIER, *Assistant Examiner.*